UNITED STATES PATENT OFFICE.

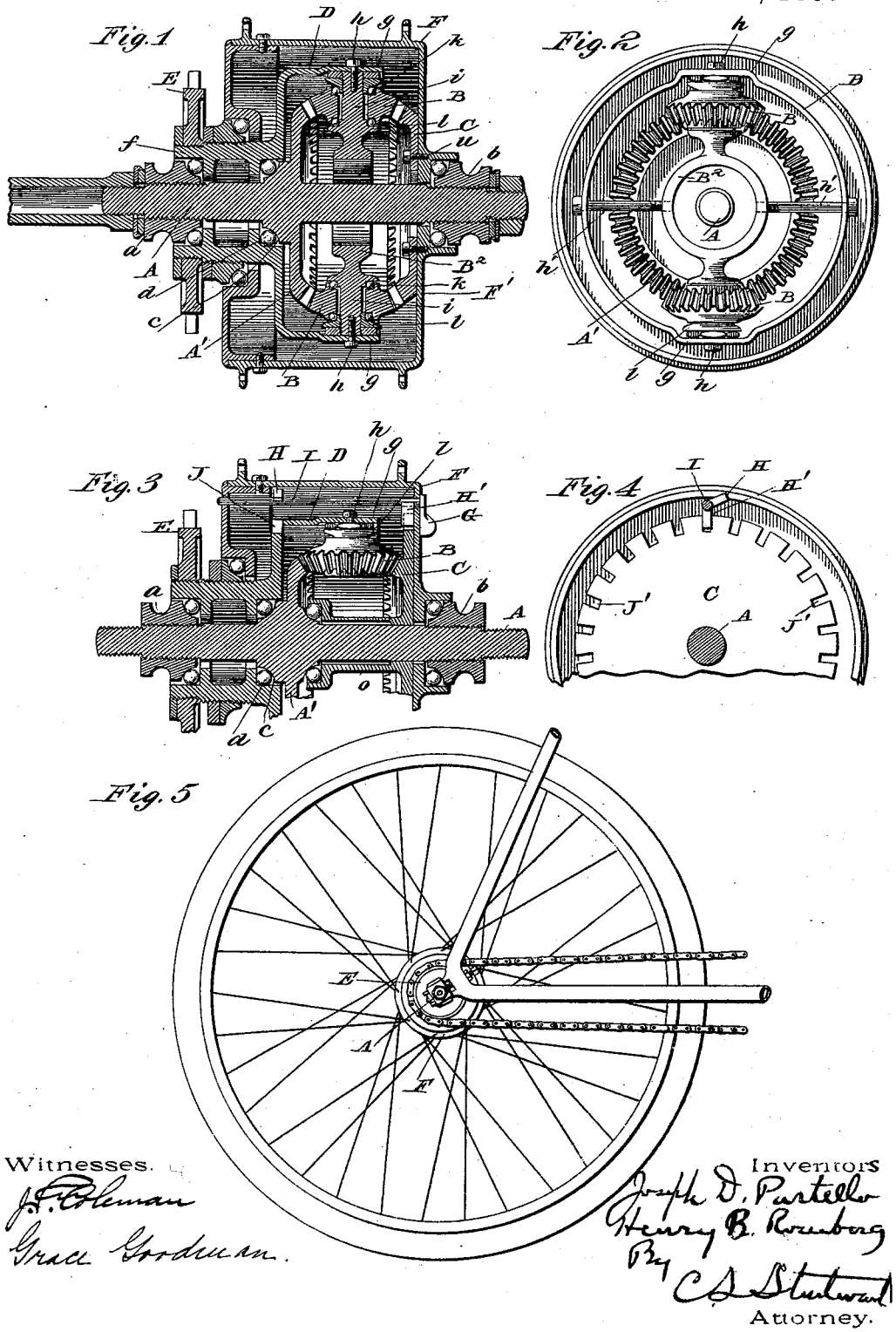

JOSEPH D. PARTELLO AND HENRY B. ROSENBERG, OF ST. JOSEPH, MICHIGAN.

GEARING.

SPECIFICATION forming part of Letters Patent No. 595,730, dated December 21, 1897.

Application filed April 2, 1897. Serial No. 630,430. (No model.)

*To all whom it may concern:*

Be it known that we, JOSEPH D. PARTELLO and HENRY B. ROSENBERG, citizens of the United States, residing at St. Joseph, in the county of Berrien, State of Michigan, have invented certain new and useful Improvements in Gearing, of which the following is a description, reference being had to the accompanying drawings and to the letters of reference marked thereon.

Our invention relates to an improvement in gearing for use in the propulsion of bicycles, tricycles, and other vehicles or conveyances, and especially to an arrangement of gearing whereby the rotary motion of the driving-wheel of a bicycle or other vehicle may be increased over the initial speed of the first driving device, such as the rear sprocket, to which the power is applied by the chain and crank.

The invention is herein illustrated as applied to the rear or driving axle of a bicycle and in connection with the rear sprocket; and one object is to provide for increasing the speed of said wheel beyond that of the sprocket and also to provide means for throwing the gearing into and out of operation when it is desired to change or not to change the speed.

The invention consists in the matters hereinafter described, and referred to in the appended claims.

The invention is illustrated in the accompanying drawings, in which—

Figure 1 is a central vertical section through the hub of the wheel. Fig. 2 is an end elevation with the outer casing or hub of the wheel removed. Fig. 3 is a view similar to Fig. 1, showing the clutch arrangement for locking the rotatable gear-supporting members together. Fig. 4 is a sectional end elevation of Fig. 3. Fig. 5 represents in perspective a bicycle rear wheel to which our invention is applied.

In the drawings while we have shown our invention as applied to the rear wheel of a bicycle it will be understood that we do not wish to be limited in this respect, for it may be used as a device for changing speed in connection with any vehicle or conveyance or indeed in various classes of machinery.

Referring now in detail to the drawings and especially to Fig. 1, A represents a fixed axle or shaft upon which the parts of the device rotate. This is provided at either end outside of the plane of the wheel with surrounding sleeves, as $a\ b$, held on by nuts or in any suitable manner, these sleeves having recesses forming sockets or seats for balls on which the rotatable members, hereinafter referred to, have their bearings. This axle A has rigidly fixed to it, preferably by being cast integrally therewith, a beveled gear $A'$, which as the axle has no movement is of course a stationary gear. The axle just back of the point of joining of the gear $A'$ with it has a recess or groove $c$, adapted to receive anti-friction-balls $d$, which with the balls $e$ afford a ball-bearing for the hub $f$ of the rotatable member or casing D, to which hub $f$ is rigidly secured or cast integral the sprocket E, to which power is applied in the usual way by a chain from the front sprocket. (Not shown.)

The rotatable member or casing D is flattened at its opposite upper and lower points, as at $g$, and supports a central hub or ring $B^2$ by means of screws $h\ h\ h'\ h'$, the screws or bolts $h'\ h'$ passing through D and $B^2$. The screws $h\ h$ pass through the ring D at the flattened part $g$ and pass into the axles or hangers $i$, upon which freely rotate bevel-gears B, which mesh with the stationary gear $A'$, which gears B as the casing or member D rotates are rotated on their axes and travel around with the member D. These bevel-gears B travel on balls $k$, held between the gears and projections or collars $l$, one of which is preferably integral with the axle or hangers $i$. It will be seen that the part $B^2$ is in reality a web or frame supported by the rotatable member D and carrying the gears B.

F is a second rotatable member or casing, which is journaled on ball-bearings to rotate around the axle A and in effect is the hub of the wheel and to which the spokes are attached in any suitable and well-known manner. This rotatable member or casing F, as shown in Fig. 1, incloses the casing or rotatable member D and has rigidly secured to its inner wall $F'$ by screws $u$ the beveled gear C, which is in mesh with the beveled gears B. By this arrangement (shown in Figs. 1 and 2) when power is applied to the sprocket or driver E the casing or member D is rotated, and as the gear A' is stationary the beveled gears B in mesh therewith will travel with the casing or member D, but will rotate on their own axes and thus transmit motion to the casing or rotating member F, which thus rotates in the same direction as the casing or member D, but at an increased speed.

The arrangement shown in Figs. 1 and 2 is a permanent device, no clutch mechanism being shown to allow of the disengagement of the gear C and the locking together of the parts D and F, so that they will rotate together as one device, in which event no change in speed will take place. In Figs. 3 and 4, however, is shown an arrangement whereby the rotatable members D F may be locked to rotate together and the gear C released from the member F, so that it will merely rotate on its own axis without imparting movement to the member F, which rotates simply through its positive connection with member D and at the same speed. In said figures, and referring particularly to Fig. 3, the same letters refer to the same parts as in Fig. 1, and in general the parts are of substantially the same construction. The beveled gear C', however, is not normally secured to the inner wall of the casing or rotatable member F, but is separate therefrom and has a horizontal part or hub o, which is journaled on balls on the axis A. To lock the gear C to the wall of the casing F, so that the latter will be rotated through the intermediate gearing, as described in connection with Fig. 1, a rod I is provided, having its bearings in the walls of the casing F, this rod being provided outside the casing with a thumb-latch G and having just within the casing a dog or projection H', adapted to engage notches J' on the gear C, and when the dog H' is in such engagement the gear C is firmly locked to the casing or member F. This rod I has also another dog H adapted to engage notches J in the periphery of the member or casing D, and when so engaged the parts D and F are locked together and rotate as one, while the gear rotates freely. The projections or dogs H H' are oppositely arranged on the shaft I, so that when H' is removed from notch J' dog H will automatically engage the notches J, and vice versa.

It will be understood that various minor modifications and changes in the details of construction of the parts of this device may be made without departing from the spirit of our invention.

Having thus described our invention, what we claim, and desire to secure by Letters Patent, is—

1. The combination with the stationary axle having a fixed bevel-gear, of a sprocket-wheel turning on the axle, having a casing inclosing said fixed gear, and provided with small bevel-gears in mesh with said fixed gear, a rotary wheel-hub inclosing the said casing and gears and having end bearings on the said axle, and the hub of the sprocket respectively, and a bevel-gear within the hub at one end thereof for rotating it and meshing with the small bevel-gears at their sides opposite said fixed bevel-gear; substantially as described.

2. The combination with the stationary axle having a fixed bevel-gear, of a sprocket-wheel turning on the axle, having a casing inclosing said fixed bevel-gear, and provided with small bevel-gears in mesh with said fixed gear, a rotary wheel-hub inclosing said casing and gears and having end bearings on the stationary axle and the sprocket-hub respectively, a loose bevel-gear within the wheel-hub and in mesh with the small bevel-gears at points opposite said fixed bevel-gear and means for locking said loose bevel-gear to the wheel-hub and releasing it therefrom; substantially as described.

3. The combination with the stationary axle provided with a fixed bevel-gear, of a driving-sprocket turning on said axle and provided with a casing inclosing said bevel-gear, and flattened beyond the gear at opposite points, a ring within the open end of said casing and provided with opposite axles k secured at their ends to said flattened portions, bolts securing the ring and casing together at points at right angles to said axle, small bevel-gears on said axle and meshing at one side with said stationary gear, a wheel-hub inclosing said casing and gearing and having end bearings on the stationary axle and the hub of the sprocket respectively, and a bevel-gear at the inner side of the hub and meshing with the small gears opposite to said fixed bevel-gear; substantially as described.

4. In the herein-described device, the external rotatable casing, a gear carried thereby, a second rotatable casing, with means for operating it, gear connections between the second casing and the gear on the external casing and means for detaching said gear from the casing and simultaneously uniting the two casings, substantially as described.

5. In the herein-described device, the fixed axle, the stationary gear thereon, the rotatable casing D, the loose gears B carried thereby and meshing with the stationary gears, the external casing F, the gear C adapted to rotate therewith, and in mesh with the gears B, means for releasing the gear C from engagement with the casing F and for locking said casings D and F together, substantially as described.

6. In the herein-described speed-changing device, the member D having notches, the rotating gear C having notches, the member F, and an oscillating rod having dogs or projections arranged thereon, to engage at alternate periods the notches on the respective parts whereby the members D and F may be locked together, or the gear C and members F, substantially as described.

7. In the herein-described device, the member D having notches, the member F, the rotating gear C having notches, and an oscillating rod having dogs or projections arranged thereon, to engage at alternate periods the notches on the respective parts whereby the members D and F may be locked together on
5 the gear C and member F, and a latch as G, on the rod outside said casing, substantially as described.

In testimony whereof we affix our signatures in presence of two witnesses.

JOSEPH D. PARTELLO.
HENRY B. ROSENBERG.

Witnesses:
L. J. MERCHANT,
LAWRENCE C. FYFE.